United States Patent
Que

(10) Patent No.: US 9,645,424 B2
(45) Date of Patent: May 9, 2017

(54) BACKBOARD OF LIQUID CRYSTAL DISPLAY

(71) Applicant: Shenzhen China Star Optoelectronics Technology Co., Ltd., Shenzhen (CN)

(72) Inventor: Chengwen Que, Shenzhen (CN)

(73) Assignee: SHENZHEN CHINA STAR OPTOELECTRONICS TECHNOLOGY CO., LTD., Shenzhen, Guangdong (TW)

( * ) Notice: Subject to any disclaimer, the term of this patent is extended or adjusted under 35 U.S.C. 154(b) by 82 days.

(21) Appl. No.: 14/758,802

(22) PCT Filed: Apr. 1, 2015

(86) PCT No.: PCT/CN2015/075695
§ 371 (c)(1),
(2) Date: Jul. 1, 2015

(87) PCT Pub. No.: WO2016/131208
PCT Pub. Date: Aug. 25, 2016

(65) Prior Publication Data
US 2016/0306216 A1   Oct. 20, 2016

(30) Foreign Application Priority Data

Feb. 17, 2015  (CN) .......................... 2015 1 0085687

(51) Int. Cl.
*G02F 1/1333*  (2006.01)
(52) U.S. Cl.
CPC .. *G02F 1/133308* (2013.01); *G02F 1/133382* (2013.01); *G02F 1/133385* (2013.01); *G02F 2001/133314* (2013.01)

(58) Field of Classification Search
CPC ......... G02F 1/133308; G02F 1/133385; G02F 2001/133314
(Continued)

(56) References Cited

U.S. PATENT DOCUMENTS 8,894,230 B2 * 11/2014 Tomomasa ........ G02F 1/133308
349/58
8,974,106 B2 * 3/2015 Zhang .................. G02B 6/0095
362/606

(Continued)

*Primary Examiner* — Hoan C Nguyen
(74) *Attorney, Agent, or Firm* — Leong C. Lei

(57) ABSTRACT

The present invention provides a backboard of a liquid crystal display, which includes a backboard body and a heat dissipation brace mounted to one side of the backboard body. The heat dissipation brace includes a bottom plate that is in contact engagement with a bottom surface of the backboard body and a side plate connected to the bottom plate. The backboard body includes, formed thereon, a plurality of lateral reinforcement ribs substantially parallel to the heat dissipation brace and a plurality of longitudinal reinforcement ribs arranged to perpendicularly intersect the plurality of lateral reinforcement ribs. The plurality of longitudinal reinforcement ribs is each extended to a site above the bottom plate of the heat dissipation brace so as to form a plurality of reinforcement extension sections on the bottom plate. The bottom plate of the heat dissipation brace includes a plurality of notches formed therein to respectively correspond to the plurality of reinforcement extension sections so that the plurality of reinforcement extension sections is respectively received and set in the notches to form an intercrossing structure with respect to the bottom plate. The backboard has a high strength and reduced reliance on material thickness of the backboard body, allowing for optimization of cost.

14 Claims, 5 Drawing Sheets

(58) Field of Classification Search
USPC ............................................................ 349/58
See application file for complete search history.

(56) References Cited

U.S. PATENT DOCUMENTS

| 9,039,267 | B2* | 5/2015 | Que ................... G02F 1/133615 |
|---|---|---|---|
| | | | 362/612 |
| 2009/0097277 | A1* | 4/2009 | Iwasaki ................ G02B 6/0091 |
| | | | 362/628 |
| 2013/0250183 | A1* | 9/2013 | Ishimoto .............. G02B 6/0085 |
| | | | 348/739 |

* cited by examiner

BACKBOARD OF LIQUID CRYSTAL DISPLAY

BACKGROUND OF THE INVENTION

1. Field of the Invention

The present invention relates to the field of display technology, and in particular to a backboard of a liquid crystal display.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise a backlight module and a liquid crystal panel coupled to the backlight module. The backlight module is generally composed of a backboard, a light-emitting diode (LED) light bar, and an optical film assembly mounted to the backboard.

The market competition of liquid crystal displays is very server and cost-effective designs are attracting more and more attention from the manufacturers. As shown in FIGS. 1 and 2, a backboard of a conventional liquid crystal display is illustrated, comprising a backboard body 100 and a heat dissipation brace 200. The heat dissipation brace 200 comprises a bottom plate 210 and a side plate 220 connected to the bottom plate 210. The backboard body 100 partly overlaps the bottom plate 210 of the heat dissipation brace 200. The backboard 100 comprises reinforcement ribs 110 formed thereon. The reinforcement ribs 110 are distributed only in an area of the backboard body 100 that does not overlap the heat dissipation brace 200 so that the area of the backboard body 100 in which the reinforcement ribs 110 are distributed and the area where the backboard body 100 overlaps the bottom plate 210 of the heat dissipation brace 200 constitute highly-reinforced areas. In the highly-reinforced areas, the backboard body 100 is strengthened by the reinforcement ribs 110 or is supported by the bottom plate 210 so that the strength of the backboard of the liquid crystal display is enhanced and reliance on the thickness of the material that makes the backboard body 110 is reduced. However, there is a reinforcement interrupted zone 300 existing between an edge of the distribution area of the reinforcement ribs 110 of the backboard of the liquid crystal display and an edge of the bottom plate 210 of the heat dissipation brace 200. In such a reinforcement interrupted zone 300, the strength of the backboard of the liquid crystal display is solely supported by the thickness of the material that makes the backboard body 110 and thus the reliance thereof on the material thickness of the backboard body 100 is increased, making it adverse to optimization of cost.

SUMMARY OF THE INVENTION

An object of the present invention is to provide a backboard of a liquid crystal display, which has a high strength and reduced reliance on material thickness of a backboard body so as to help facilitate optimization of cost.

To achieve the above object, the present invention first provides a backboard of a liquid crystal display, which comprises a backboard body and a heat dissipation brace mounted to one side of the backboard body. The heat dissipation brace comprises a bottom plate that is in contact engagement with a bottom surface of the backboard body and a side plate connected to the bottom plate. The backboard body comprises, formed thereon, a plurality of lateral reinforcement ribs substantially parallel to the heat dissipation brace and a plurality of longitudinal reinforcement ribs arranged to perpendicularly intersect the plurality of lateral reinforcement ribs. The plurality of longitudinal reinforcement ribs is each extended to a site above the bottom plate of the heat dissipation brace so as to form a plurality of reinforcement extension sections on the bottom plate. The bottom plate of the heat dissipation brace comprises a plurality of notches formed therein to respectively correspond to the plurality of reinforcement extension sections so that the plurality of reinforcement extension sections is respectively received and set in the notches to form an intercrossing structure with respect to the bottom plate.

The backboard body comprises an area, in which the plurality of reinforcement extension sections and the bottom plate of the heat dissipation brace collectively form the intercrossing structure, providing a reinforcement reduplication zone.

The lateral reinforcement ribs and the longitudinal reinforcement ribs are each formed of a concave groove.

The lateral reinforcement ribs and the longitudinal reinforcement ribs are each recessed in a surface of the backboard body that is distant from the bottom plate of the heat dissipation brace.

The lateral reinforcement ribs and the longitudinal reinforcement ribs are each raised in a surface of the backboard body that is adjacent to the bottom plate of the heat dissipation brace.

The notches are each of a U-shape.

The backboard body and the bottom plate of the heat dissipation brace are respectively provided with a plurality of through holes and threaded holes corresponding to each other. A plurality of screws is respectively received through the plurality of through holes to screw into the corresponding ones of the through holes to couple the backboard body and the bottom plate of the heat dissipation brace to each other so as to securely fix the backboard body and the heat dissipation brace together.

The side plate of the heat dissipation brace comprises a light-emitting diode light bar mounted thereto.

The present invention also provides a backboard of a liquid crystal display, which comprises a backboard body and a heat dissipation brace mounted to one side of the backboard body, the heat dissipation brace comprising a bottom plate that is in contact engagement with a bottom surface of the backboard body and a side plate connected to the bottom plate, the backboard body comprising, formed thereon, a plurality of lateral reinforcement ribs substantially parallel to the heat dissipation brace and a plurality of longitudinal reinforcement ribs arranged to perpendicularly intersect the plurality of lateral reinforcement ribs, the plurality of longitudinal reinforcement ribs each extended to a site above the bottom plate of the heat dissipation brace so as to form a plurality of reinforcement extension sections on the bottom plate, the bottom plate of the heat dissipation brace comprising a plurality of notches formed therein to respectively correspond to the plurality of reinforcement extension sections so that the plurality of reinforcement extension sections is respectively received and set in the notches to form an intercrossing structure with respect to the bottom plate;

wherein the backboard body comprises an area, in which the plurality of reinforcement extension sections and the bottom plate of the heat dissipation brace collectively form the intercrossing structure, providing a reinforcement reduplication zone; and wherein the notches are each of a U-shape.

The efficacy of the present invention is that the present invention provides a backboard of an LCD, which helps increase the strength of the LCD backboard by extending reinforcement ribs formed on the backboard body to a site above the bottom plate of the heat dissipation brace to eliminate reinforcement interruption occurring in a conventional LCD backboard and to provide a reinforcement reduplication zone in an area where the backboard body and the bottom plate of the heat dissipation brace overlap each other, whereby reliance of the LCD backboard on the material thickness of the backboard body is reduced and optimization of cost may be enhanced.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
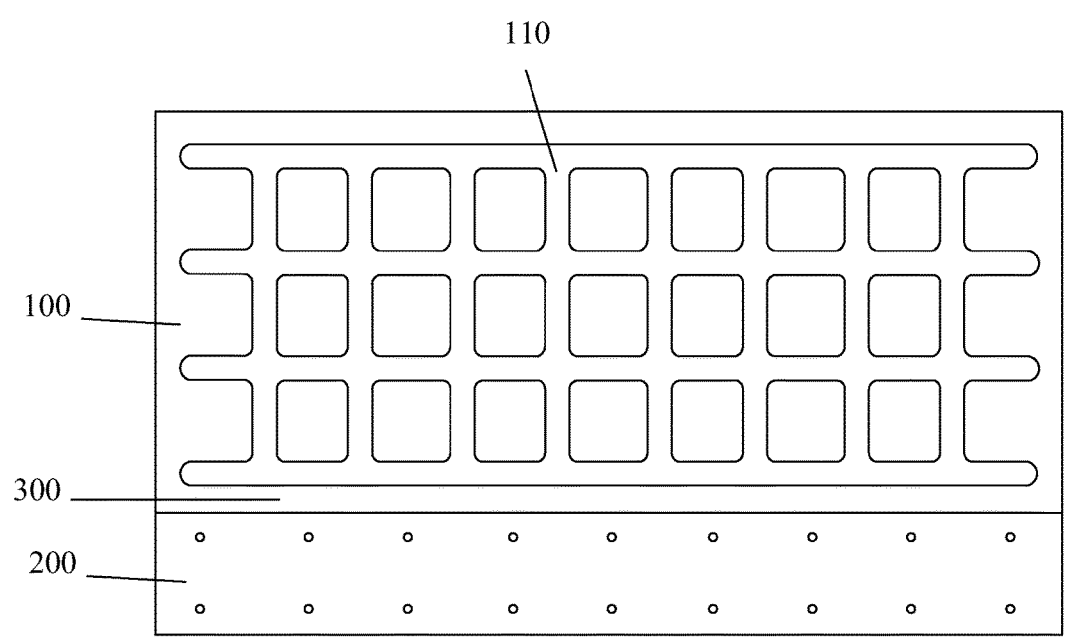
FIG. 1 is a bottom view showing a backboard of a conventional liquid crystal display.
Figure 2:
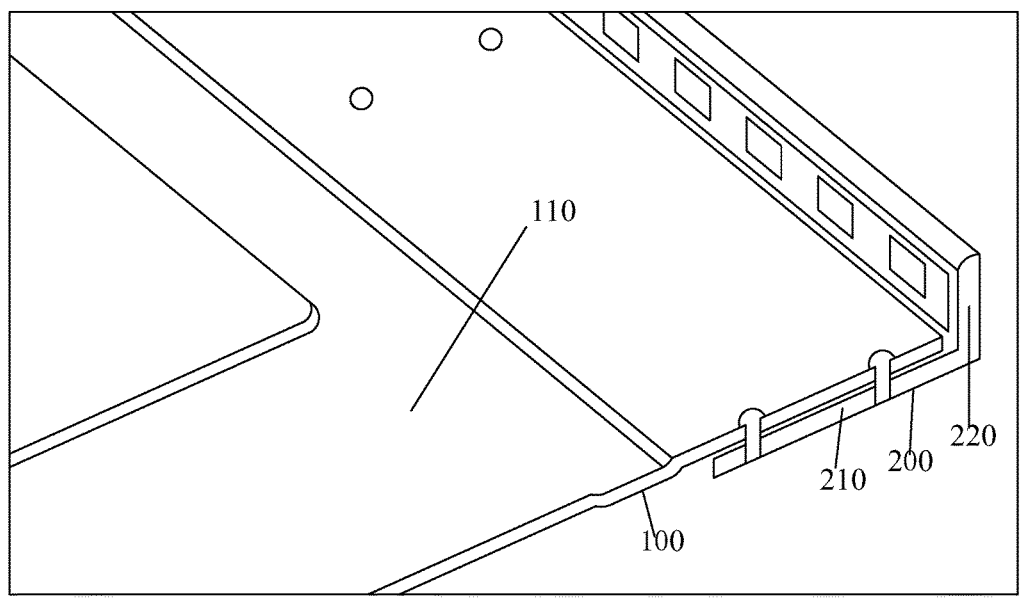
FIG. 2 is a top-side perspective view showing a portion of the backboard of the liquid crystal display shown in FIG. 1.
Figure 3:
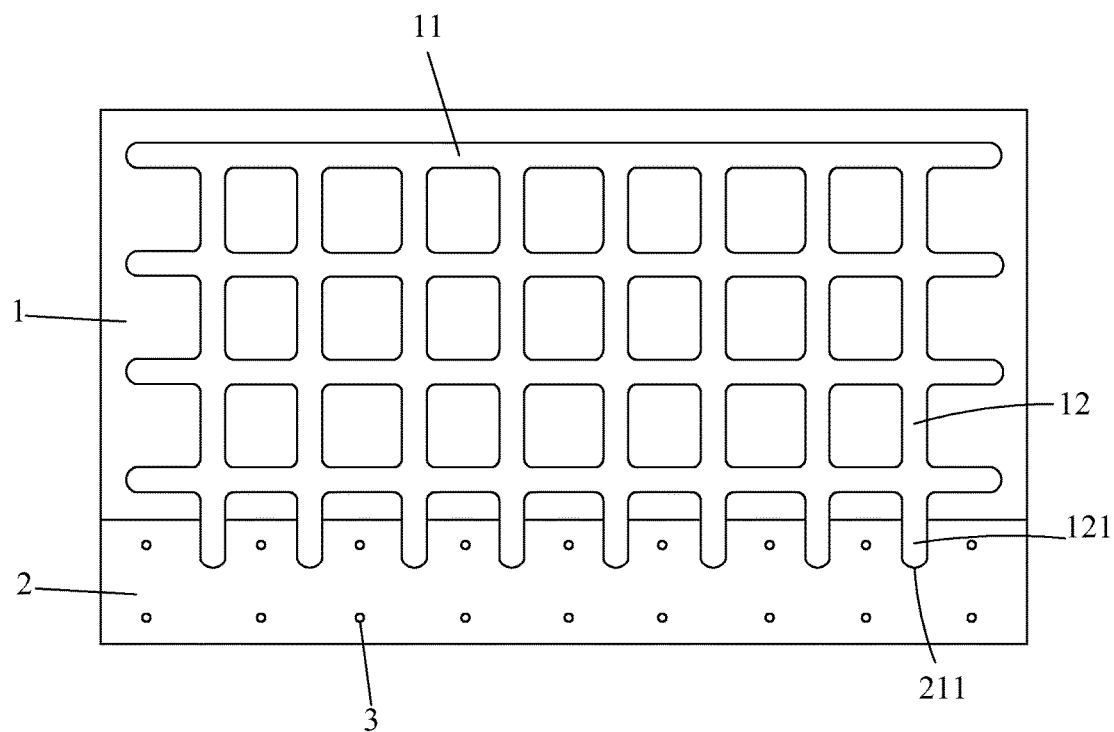
FIG. 3 is a bottom view showing a backboard of a liquid crystal display according to the present invention.
Figure 4:
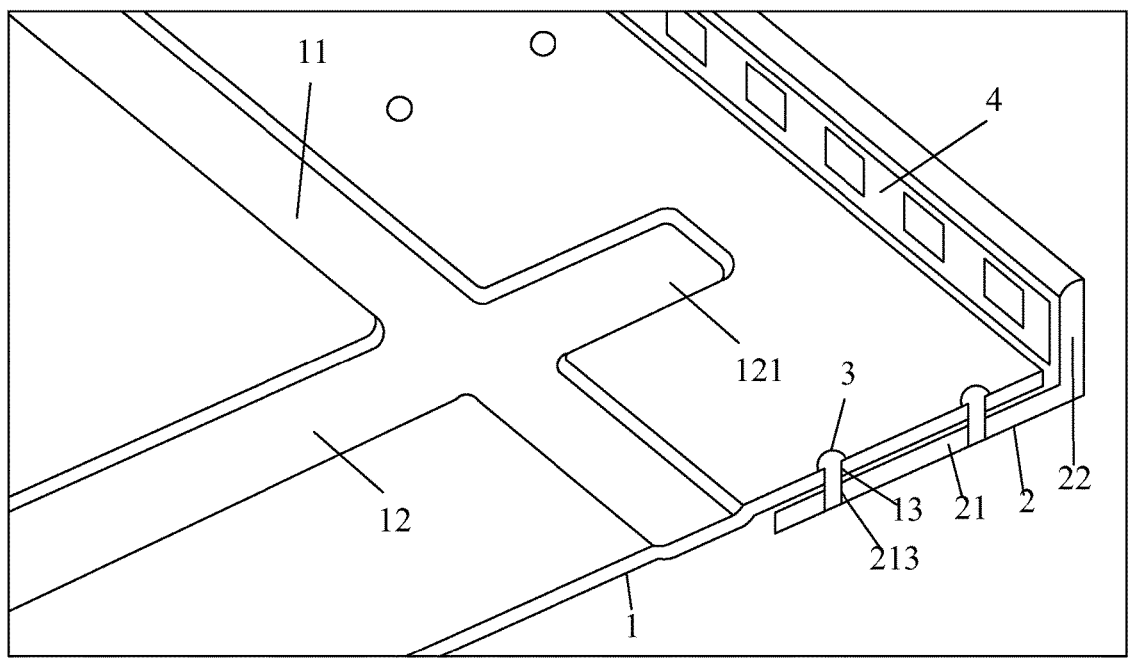
FIG. 4 is a top-side perspective view showing a portion of the backboard of the liquid crystal display shown in FIG. 3.
Figure 5:
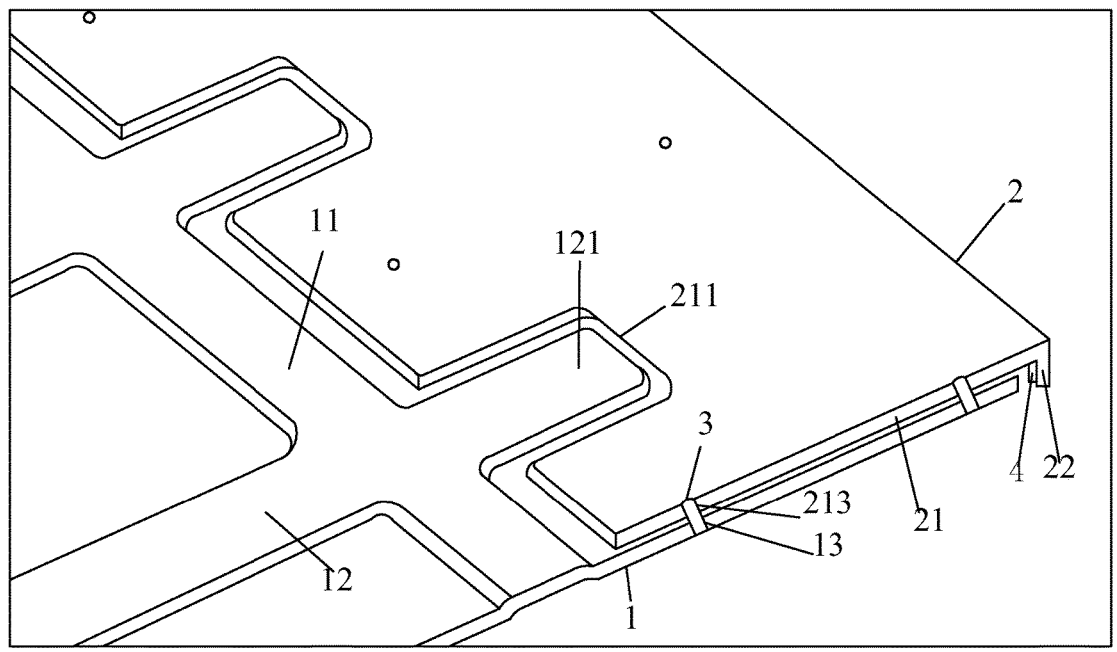
FIG. 5 is a bottom-side perspective view showing a portion of the backboard of the liquid crystal display shown in FIG. 3.

Referring to FIGS. 3-5, the present invention provides a backboard of a liquid crystal display (LCD), which comprises a backboard body 1 and a heat dissipation brace 2 mounted to one side of the backboard body 1. The heat dissipation brace 2 comprises a bottom plate 21 that is in contact engagement with a bottom surface of the backboard body 1 and a side plate 22 connected to the bottom plate 21. The backboard body 1 comprises, formed thereon, a plurality of lateral reinforcement ribs 11 substantially parallel to the heat dissipation brace 2 and a plurality of longitudinal reinforcement ribs 12 arranged to perpendicularly intersect the plurality of lateral reinforcement ribs 11. The plurality of longitudinal reinforcement ribs 12 is each extended to a site above the bottom plate 21 of the heat dissipation brace 2 so as to form a plurality of reinforcement extension sections 121 on the bottom plate 21. The bottom plate 21 of the heat dissipation brace 2 comprises a plurality of notches 211 formed therein to respectively correspond to the plurality of reinforcement extension sections 121 so that the plurality of reinforcement extension sections 121 is respectively received and set in the notches 211 to form an intercrossing structure with respect to the bottom plate 21.

Compared to the known art, the LCD backboard of the present invention comprises no reinforcement interrupted zone and the area where the intercrossing structure is formed collectively by the plurality of reinforcement extension sections 121 of the backboard body 1 and the bottom plate 21 of the heat dissipation brace 2 is located provides a reinforcement reduplication zone, which further helps increase the strength of the LCD backboard so as to reduce the reliance of the LCD backboard on the material thickness of the backboard body 1, allowing for optimization of cost.

Specifically, the lateral reinforcement ribs 11 and the longitudinal reinforcement ribs 12 are each formed of a concave groove.

Further, the lateral reinforcement ribs 11 and the longitudinal reinforcement ribs 12 are formed by recessing the surface of the backboard body 1 that is distant from the bottom plate 21 of the heat dissipation brace 2 and the lateral reinforcement ribs 11 and the longitudinal reinforcement ribs 12 are each formed as a projection raised on the surface of the backboard body 1 that is adjacent to the bottom plate 21 of the heat dissipation brace 2.

Specifically, the notches 211 are each of a U-shape having a size and configuration corresponding to a size and configuration of the reinforcement extension sections 121 so as to receive and accommodate the reinforcement extension sections 121 in the U-shaped notches 211, whereby the bottom plate 21 of the heat dissipation brace 2 and the reinforcement extension sections 121 of the backboard body 1 collectively form an intercrossing structure and such an intercrossing structure is located in the reinforcement reduplication zone between the backboard body 1 and the heat dissipation brace 2 to provide continuity of strength between the backboard body 1 and the heat dissipation brace 2 and eliminate reinforcement interruption that is found in the known art and also to provide a thin and light design of the backboard body 1 with simultaneous enhancement of overall heat dissipation performance.

Further, the backboard body 1 and the bottom plate 21 of the heat dissipation brace 2 are respectively provided with a plurality of through holes 13 and threaded holes 213 that correspond to each other. A plurality of screws 3 is respectively set through the plurality of through holes 13 to screw into the threaded holes 213 that correspond to the through holes 13 thereby coupling the backboard body 1 and the bottom plate 21 of the heat dissipation brace 2 to each other and thus securely fixing the backboard body 1 and the heat dissipation brace 2 together.

A light-emitting diode (LED) light bar 4 is mounted, preferably adhesively, to the side plate 22 of the heat dissipation brace 2 to serve as a light source for the display.

In summary, the present invention provides a backboard of an LCD, which helps increase the strength of the LCD backboard by extending reinforcement ribs formed on the backboard body to a site above the bottom plate of the heat dissipation brace to eliminate reinforcement interruption occurring in a conventional LCD backboard and to provide a reinforcement reduplication zone in an area where the backboard body and the bottom plate of the heat dissipation brace overlap each other, whereby reliance of the LCD backboard on the material thickness of the backboard body is reduced and optimization of cost may be enhanced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backboard of a liquid crystal display, comprising a backboard body and a heat dissipation brace mounted to one side of the backboard body, the heat dissipation brace comprising a bottom plate that extends in a horizontal plane and is in surface contact engagement with a bottom surface of the backboard body that extends horizontally and is substantially parallel to the horizontal plane of the bottom plate of the heat dissipation brace and a side plate connected to the bottom plate, the backboard body comprising, formed thereon, a plurality of lateral reinforcement ribs substantially parallel to the bottom plate of the heat dissipation brace and a plurality of longitudinal reinforcement ribs arranged to perpendicularly intersect the plurality of lateral reinforcement ribs, the plurality of longitudinal reinforcement ribs each extended to a site above the bottom plate of the heat dissipation brace so as to form a plurality of reinforcement extension sections on the bottom surface of the backboard body, the bottom plate of the heat dissipation brace comprising a plurality of notches formed therein to define a plurality of horizontal projections arranged on the horizontal plane, wherein the plurality of notches respectively correspond to the plurality of reinforcement extension sections so that the plurality of reinforcement extension sections are respectively received and set in the notches in such a way that the plurality of reinforcement extension sections of the bottom surface of the backboard body are on the horizontal plane of the bottom plate of the heat dissipation brace and the plurality of reinforcement extension sections of the bottom surface of the backboard body alternate with the plurality of horizontal projections of the bottom plate of the heat dissipation brace to collectively form an intercrossing structure between the backboard body and the bottom plate of the heat dissipation brace on the horizontal plane of the bottom plate of the heat dissipation brace.

2. The backboard of the liquid crystal display as claimed in claim 1, wherein the backboard body comprises an area, in which the plurality of reinforcement extension sections and the bottom plate of the heat dissipation brace collectively form the intercrossing structure, providing a reinforcement reduplication zone.

3. The backboard of the liquid crystal display as claimed in claim 1, wherein the lateral reinforcement ribs and the longitudinal reinforcement ribs are each formed of a concave groove.

4. The backboard of the liquid crystal display as claimed in claim 3, wherein the lateral reinforcement ribs and the longitudinal reinforcement ribs are each recessed in a surface of the backboard body that is distant from the bottom plate of the heat dissipation brace.

5. The backboard of the liquid crystal display as claimed in claim 3, wherein the lateral reinforcement ribs and the longitudinal reinforcement ribs are each raised in a surface of the backboard body that is adjacent to the bottom plate of the heat dissipation brace.

6. The backboard of the liquid crystal display as claimed in claim 1, wherein the notches are each of a U-shape.

7. The backboard of the liquid crystal display as claimed in claim 1, wherein the backboard body and the bottom plate of the heat dissipation brace are respectively provided with a plurality of through holes and threaded holes corresponding to each other, a plurality of screws being respectively received through the plurality of through holes to screw into the corresponding ones of the through holes to couple the backboard body and the bottom plate of the heat dissipation brace to each other so as to securely fix the backboard body and the heat dissipation brace together.

8. The backboard of the liquid crystal display as claimed in claim 1, wherein the side plate of the heat dissipation brace comprises a light-emitting diode light bar mounted thereto.

9. A backboard of a liquid crystal display, comprising a backboard body and a heat dissipation brace mounted to one side of the backboard body, the heat dissipation brace comprising a bottom plate that extends in a horizontal plane and is in surface contact engagement with a bottom surface of the backboard body that extends horizontally and is substantially parallel to the horizontal plane of the bottom plate of the heat dissipation brace and a side plate connected to the bottom plate, the backboard body comprising, formed thereon, a plurality of lateral reinforcement ribs substantially parallel to the bottom plate of the heat dissipation brace and a plurality of longitudinal reinforcement ribs arranged to perpendicularly intersect the plurality of lateral reinforcement ribs, the plurality of longitudinal reinforcement ribs each extended to a site above the bottom plate of the heat dissipation brace so as to form a plurality of reinforcement extension sections on the bottom surface of the backboard body, the bottom plate of the heat dissipation brace comprising a plurality of notches formed therein to define a plurality of horizontal projections arranged on the horizontal plane, wherein the plurality of notches respectively correspond to the plurality of reinforcement extension sections so that the plurality of reinforcement extension sections are respectively received and set in the notches in such a way that the plurality of reinforcement extension sections of the bottom surface of the backboard body are on the horizontal plane of the bottom plate of the heat dissipation brace and the plurality of reinforcement extension sections of the bottom surface of the backboard body alternate with the plurality of horizontal projections of the bottom plate of the heat dissipation brace to collectively form an intercrossing structure between the backboard body and the bottom plate of the heat dissipation brace on the horizontal plane of the bottom plate of the heat dissipation brace;

wherein the backboard body comprises an area, in which the plurality of reinforcement extension sections and the bottom plate of the heat dissipation brace collectively form the intercrossing structure, providing a reinforcement reduplication zone; and wherein the notches are each of a U-shape.

10. The backboard of the liquid crystal display as claimed in claim 9, wherein the lateral reinforcement ribs and the longitudinal reinforcement ribs are each formed of a concave groove.

11. The backboard of the liquid crystal display as claimed in claim 10, wherein the lateral reinforcement ribs and the longitudinal reinforcement ribs are each recessed in a surface of the backboard body that is distant from the bottom plate of the heat dissipation brace.

12. The backboard of the liquid crystal display as claimed in claim 10, wherein the lateral reinforcement ribs and the longitudinal reinforcement ribs are each raised in a surface of the backboard body that is adjacent to the bottom plate of the heat dissipation brace.

13. The backboard of the liquid crystal display as claimed in claim 9, wherein the backboard body and the bottom plate of the heat dissipation brace are respectively provided with a plurality of through holes and threaded holes corresponding to each other, a plurality of screws being respectively received through the plurality of through holes to screw into the corresponding ones of the through holes to couple the backboard body and the bottom plate of the heat dissipation brace to each other so as to securely fix the backboard body and the heat dissipation brace together.

14. The backboard of the liquid crystal display as claimed in claim 9, wherein the side plate of the heat dissipation brace comprises a light-emitting diode light bar mounted thereto.

* * * * *